May 21, 1935.    G. F. UPHAM    2,001,947
ATTACHMENT FOR CONTAINERS
Filed Aug. 4, 1934
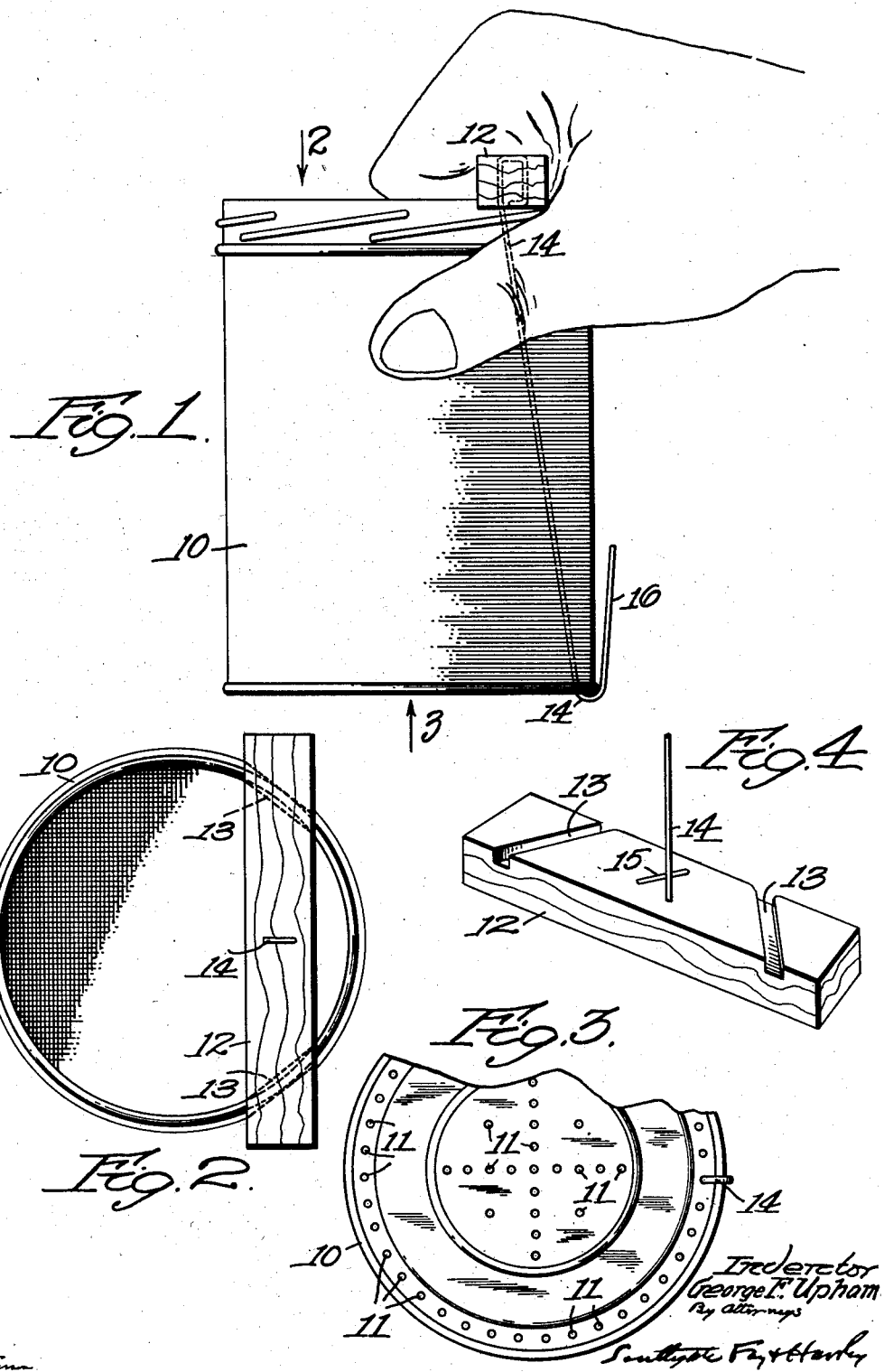

Patented May 21, 1935

2,001,947

UNITED STATES PATENT OFFICE 2,001,947

ATTACHMENT FOR CONTAINERS

George F. Upham, Bronxville, N. Y.

Application August 4, 1934, Serial No. 738,482

7 Claims. (Cl. 220—94)

This invention relates to a device adapted to be attached to a can that has been used for the purpose of selling some commodity or to a new can or other container.

The principal objects of the invention are to provide a new can or used container with a handle which can be distributed by the distributor of the goods which are packed in the can originally; to provide such handle in a form in which it can be attached to the top of the can securely by means of a wire extending downwardly in the can or container and adapted to be inserted through one of the numerous perforations provided in the bottom or a special perforation in the bottom or side of the container and then bent up to hold the handle firmly in position, and, in short, to provide such a container with a firm, convenient and inexpensive handle which can be used by the distributor of the goods as a means for increasing his sales by giving them to his customers.

Other objects and advantages of the invention will appear hereinafter.

Reference is to be had to the accompanying drawing, in which

Fig. 1 is a side view of a coffee can provided with a handle and employed as a watering pot;

Fig. 2 is a plan of the same;

Fig. 3 is a bottom plan view of the pot, and

Fig. 4 is a bottom perspective view of the handle by itself.

This invention is intended to be used for the purpose of promoting the sale of products, such as coffee, tea and other dry groceries and the like.

The way in which the sales are improved is as follows: The distributor of such groceries will place one of these handles with the goods and distribute them to such customers as desire them, using whatever means may be desired for acquainting customers with the use to which it may be put. In this way the customer gets a convenient watering pot, sifter, or other useful article, without charge and is enabled to convert his coffee can, or the like, into the same with very little trouble. It has been possible before, of course, to convert such a can into a watering pot by punching holes in the bottom but without a handle, which was an inconvenient and awkward device to use and manipulate. This difficulty is entirely overcome by the present invention. Furthermore, if a can rusts or gets misshaped in use, it is very easy for the user to remove the handle and apply it to a new can. It has not been convenient or practicable to convert such a container into a useful article of any kind heretofore.

A coffee can 10 is shown with the cover removed and with perforations 11 punched in the bottom by the user to such an extent as he may desire, for the purpose of allowing water to run out for irrigating potted flowers, vegetables or flowers in the garden or for sifting dry material. The distributor gives the customer a handle 12 in the form of a wooden bar having two grooves 13 at an angle to each other or, if desired, on a curvature the same as the curvature on the top of the can. The handle is also provided with a soft wire 14 anchored to the handle by passing through it and turning it over the end at 15.

In converting the coffee can, or the like, into a watering pot or sieve, the bottom is perforated either from the inside or from the outside, and the handle 12 placed upon the top of the can with the grooves 13 fitting the upper edge of the can. This will bring it, as will be noticed, at a distance from the extreme side of the can. Then the wire is passed downwardly through one of the edge perforations 11 and bent downwardly and upwardly at 16 to anchor it firmly in place and secure the handle in the desired position. A certain amount of pressure can be brought to bear on the handle by the bending of the wire so that the handle will be firmly anchored in place.

If the holes are punched through the bottom from the inside out it makes a wonderful sieve for dipping into the material and then sifting it over gardens or anything else, but if they are punched from the outside in, it makes a good retainer for bugs, etc. For other uses the bottom is not provided with perforations but with only one for receiving the wire, or the perforation for that purpose may be in the side near the bottom.

By spacing the handle inwardly from the side of the top of the can, by the location of the grooves 13, the handle is located in such position that it can be grasped readily by the fingers of the user and furnish a firm support therefor and with a space underneath it in which the fingers can be placed to grasp it firmly.

This constitutes a very simple and inexpensive device and one that can be used effectively and satisfactorily for a variety of purposes.

Having thus described my invention and the advantages thereof, I do not wish to be limited to the details herein disclosed, otherwise than as set forth in the claims, but what I claim is:—

1. As an article of manufacture, a container having an open top and a perforation in the bottom and a handle extending across the top and provided with a single central means extending through said perforation for holding the handle in place on the top of the container.

2. As an article of manufacture, a container having an open top, a flat handle fitted to the container so as to be spaced from the side thereof, and a soft wire secured to the center of said handle and extending downwardly inside the container and through it and bent to hold the wire and handle in place.

3. As an article of manufacture, a watering pot comprising a can having an open top and a perforated bottom and a handle extending across the top of the can and provided with means extending through one of the perforations in the bottom for anchoring the handle in place.

4. As an article of manufacture, a watering pot comprising a metal can open at the top and having a perforated bottom, a handle fitted to the top of the can so as to be spaced from the side thereof, and a soft wire firmly secured to the handle and extending downwardly the whole length of the can and through one of the perforations in the bottom to anchor it thereto.

5. As an article of manufacture, a watering pot comprising a can open at the top and having a perforated bottom, a wooden handle having a pair of grooves in the bottom thereof, converging toward each other to receive the upper edge of the can and locate the handle in the desired position on said edge, and a soft wire secured to the handle at the center thereof between said grooves and extending downwardly in the can and through a perforation near the edge at the bottom and bent upwardly on the outside of the can to hold it and the handle firmly in place.

6. As an article of manufacture, a handle for the purpose described comprising a strip of wood, having a pair of grooves on the under side converging toward each other and a soft wire fixedly secured thereto at a central point between the grooves for the purpose described.

7. As an article of manufacture, a container having an open top and a perforated bottom, a handle extending across the top near one side thereof and in contact therewith, and a single wire extending from the center of the handle and secured through one of the perforations in the bottom to hold the handle rigidly in place on the top of the container.

GEORGE F. UPHAM.